(12) United States Patent
Strian et al.

(10) Patent No.: US 9,267,195 B2
(45) Date of Patent: Feb. 23, 2016

(54) TEMPERED STEEL

(75) Inventors: Ernst Strian, Kunreuth (DE); Ihor Mys, Erlangen (DE); Dieter Adler, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 943 days.

(21) Appl. No.: 13/416,649

(22) Filed: Mar. 9, 2012

(65) Prior Publication Data

US 2012/0216642 A1 Aug. 30, 2012

Related U.S. Application Data

(63) Continuation of application No. PCT/EP2011/061530, filed on Jul. 7, 2011.

(60) Provisional application No. 61/451,290, filed on Mar. 10, 2011.

(30) Foreign Application Priority Data

Oct. 11, 2010 (DE) .......................... 10 2010 048 134

(51) Int. Cl.
| | |
|---|---|
| F16H 19/04 | (2006.01) |
| C22C 38/22 | (2006.01) |
| B62D 3/12 | (2006.01) |
| C21D 9/32 | (2006.01) |
| C21D 1/06 | (2006.01) |
| C21D 1/25 | (2006.01) |
| C22C 38/00 | (2006.01) |
| C22C 38/02 | (2006.01) |
| C22C 38/04 | (2006.01) |
| C22C 38/16 | (2006.01) |
| C22C 38/18 | (2006.01) |
| C22C 38/28 | (2006.01) |
| C22C 38/32 | (2006.01) |
| F16H 25/24 | (2006.01) |
| F16H 55/26 | (2006.01) |

(52) U.S. Cl.
CPC ................ *C22C 38/22* (2013.01); *B62D 3/126* (2013.01); *C21D 1/06* (2013.01); *C21D 1/25* (2013.01); *C21D 9/32* (2013.01); *C22C 38/001* (2013.01); *C22C 38/02* (2013.01); *C22C 38/04* (2013.01); *C22C 38/16* (2013.01); *C22C 38/18* (2013.01); *C22C 38/28* (2013.01); *C22C 38/32* (2013.01); *C21D 2261/00* (2013.01); *F16H 25/24* (2013.01); *F16H 55/26* (2013.01); *Y10T 74/1967* (2015.01); *Y10T 74/1987* (2015.01)

(58) Field of Classification Search
CPC ............ C21D 9/32; C21D 7/02; C22C 38/01; C22C 38/02; C22C 38/04
USPC .......................................... 148/320
See application file for complete search history.

(56) References Cited

U.S. PATENT DOCUMENTS

| | | | |
|---|---|---|---|
| 5,545,267 A | 8/1996 | Ochi et al. | |
| 2004/0202567 A1 | 10/2004 | Takada et al. | |
| 2005/0252321 A1* | 11/2005 | Hartig et al. | ................. 74/89.23 |

FOREIGN PATENT DOCUMENTS

| | | |
|---|---|---|
| DE | 102004038951 A | 2/2006 |
| EP | 0265402 A | 4/1988 |
| EP | 0643148 | 3/1995 |
| JP | 5059486 A | 3/1993 |

* cited by examiner

Primary Examiner — Jessee Roe
Assistant Examiner — Christopher Kessler
(74) Attorney, Agent, or Firm — Simpson & Simpson, PLLC

(57) ABSTRACT

A rolling resistant heat-treated steel, which has the following elements indicated in mass fractions in relation to the overall weight: 0.5% to 0.6% inclusive carbon, 0.0031% to 0.005% inclusive boron and 3.5 parts or more parts of titanium in relation to 1 part of nitrogen.

4 Claims, 3 Drawing Sheets

TEMPERED STEEL

FIELD OF THE INVENTION

The invention relates to a rolling resistant heat-treated steel, to bar material formed therefrom, and also to processes for producing a threaded spindle and a toothed rack part from said bar material.

BACKGROUND OF THE INVENTION

Upon contact between two bodies, a polyaxial stress state is formed under the contact surfaces and can be converted into material strain via the equivalent stress or shear stress hypothesis. This is also the case if both bodies roll on one another; by way of example, a bail can roll on a plane or in a ball groove. A material is resistant to rolling if it can withstand this loading durably, without damage arising as a result of material fatigue. An inadequate rolling strength becomes apparent initially in a microstructural transformation or in a progressed stage in destruction of the raceway contour by the breakaway of small material fractions. Depending on the nature of contact (point or linear contact), a hardness of 58 HRc or 650 HV at the site of the greatest pressure is deemed to be sufficient for the required rolling strength.

Heat-treated steels are suitable for hardening with subsequent tempering on account of their carbon content. A heat-treated steel can be an alloyed steel. An alloy is described by indicating the mass fractions of the components thereof as a percentage. The percentages indicated for describing the present invention are mass data which indicate the percentage in relation to the overall weight. The heat-treated steels include steels for surface layer hardening in accordance with DIN 17212. In the case of partial hardening, in the surface layer of the component, only the surface layer has a martensitic microstructure, with the core having a heat-treated microstructure, Hardening refers to the process of rapid cooling from the austenite area, with the austenite being transformed into martensite.

Tempering is understood to mean heating after preceding hardening to a temperature below "Ac1." This can be effected with the objective of a heat treatment or for reducing internal stresses in the microstructure. In the iron-carbon diagram, Ac1 denotes the first transformation point upon heating of the steel, This transformation point denotes the start of the alpha-gamma transformation (start of austenite formation).

Bar material denotes, in particular, bars having any desired cross-sectional. profile, for example rectangular profiles and round profiles. The length of the bars can vary depending on the use; lengths of up to several meters are possible.

A known heat-treated steel Cf53 with the material number 1,2113 is normalized or spheroidized for subsequent machining, The intention of the normalizing is for a uniform microstructure with a fine grain to he formed in the material. It is employed for eliminating non-uniform and coarse microstructures.

In the case of spheroidizing, the focus is on the change in the elongation at break and in the hardness. As a result of the annealing, the strip-like cementite loses strength and can follow up in striving for a body with the smallest possible surface. Granular cementite is formed, which is why this is also referred to as spheroidizing. As a result, it is easier to form and machine the material.

Soft annealing achieves an improvement in machinability in the case of steels having a carbon content of greater than 0.4% by weight, There is a dependency between the mechanical properties and microstructure constituents (ferrite, pearlite) and also the distribution thereof and the degree of spheroidization of the carbides. These annealed steels have a relatively low core strength.

Said heat-treated steels are often pre-heat-treated as round bars. In the case of average and higher diameters, 20 to 40 mm, non-uniform through-hardenability or heat treatability may he present, and consequently inhomogeneous mechanical properties and also residual stresses and distortion may be the result. By way of example, the low-alloyed heat-treated steel Cf53 can only be heat-treated all the way through as bar material to a diameter of less than 20 mm. The bar material which has been heat-treated all the way through has a largely homogeneous heat-treated microstructure, as seen over the cross-section.

The round bars which have been pre-heat-treated can be machined by chip-forming processes or forming processes and finally hardened and tempered. During the hardening, it is often the case that merely the surface layer is hardened.

A defined increase in the mechanical properties which is tolerated within relatively narrow limits can be achieved via heat treatment of the bar cross-section. This is a foundation of controlled cold forming processes. An even better hardenability of the surface layer is possible out of the heat-treated microstructure.

The hardness penetration is an important criterion for a high-quality heat treatment. The objective of a heat treatment within the context of the abovementioned application is to produce uniform mechanical properties.

SUMMARY OF THE INVENTION

It is an object of the present invention to specify a heat-treated steel. which has an improved heat treatability in particular of bar material.

According to the invention, this object was achieved by the heat-treated steel which comprises 0.05% to 0.06% inclusive carbon, 0.0031% to 0.005% inclusive boron and 3.5 parts or more parts of titanium in relation to 1 part of nitrogen. The elements are indicated in mass fractions in relation to overall weight. However, the ratio between titanium and nitrogen can also be determined in a known manner in analysis, for example spectral analysis.

The material according to the invention, with the addition of boron in the mass fractions indicated as a percentage in conjunction with at least 3.5 parts of titanium to one part of nitrogen, makes it possible to provide a rolling resistant heat-treated steel which can be heat-treated all the way through and hardened in its surface layer. The heat-treated steel according to the invention is distinguished by a steep slope in the Jominy curve, which, compared to a comparable known heat-treated steel, is displaced by the factor of 2 away from the end face. Accordingly, bar material having diameters of up to 40 mm can be provided with uniform hardness penetration.

In particular, a bar material produced from this heat-treated steel according to the invention can be provided as a semi-finished product, where diameters of up to 40 mm can be heat-treated all the way through and hardened in the surface layer. This bar material can be heat-treated all the way through to a yield strength of at least 550 MPa in the core. This bar material is outstandingly suitable for the production of threaded spindles of ball screw drives or toothed racks of rack-and-pinion steering systems. Such toothed racks in particular are subject to particularly high demands as a safety component.

Steels which can be hardened in their surface layer are described in DIN 17212. They can usually be hardened in the heat-treated state by local heating and quenching in the surface zone, without the strength and toughness properties of the core being significantly influenced. The heat-treated steel Cf53 counts among these steels. To harden the surface zone, these steels are flame-hardened or induction-hardened. These hardening processes are indicated in DIN 17014.

The 0.2% elongation limit $R_{p0.2}$, or yield strength, describes that (uniaxial) mechanical stress in the case of which the remaining elongation based on the initial length of the sample after load relief is exactly 0.2%.

The core of the bar material denotes approximately the center of the cross-section of the bar material.

The Jominy end quench test (DIN EN ISO 642) serves to test the hardenability of steel. This test determines the highest achievable hardness on quench hardening (hardness increase) and the profile of the hardness into the depth given a certain cross-section (hardness penetration). In the Jominy end quench test, a cylindrical steel sample having a length of 100 millimeters and a diameter of 25 millimeters is heated to hardening temperature after the material-dependent normalizing, is then taken from the furnace within 5 seconds and is quenched at the end face from below for at least 10 min with a water jet at a temperature of 20° C. Then, the lateral surface of the cylinder is surface-ground oppositely by 0.4 to 0.5 millimeter. Proceeding from the margin of the quenched end face, the Rockwell hardness (HRC) or Vickers hardness (HV) is measured in steps (1.5-3-5-7-9-11-13-15-20-25-30 . . . millimeters).

Heat-treated steels according to the invention have a carbon content of 0.5% to 0.6% inclusive. Carbon contents outside this range are not provided for the invention. The carbon content is limited on account of its influence on the yield stress of the material. Together with other elements, carbon raises the yield stress. Furthermore, a C content of more than 0.7% virtually no longer increases the martensite content; a lower limit for the formation of 100% martensite is to be considered about 0.5% by weight carbon.

It has been recognized that the admixture of boron in the range provided according to the invention entails advantages in the case of heat-treated steels having the indicated carbon content, particularly in the case of bar material: thus, it was possible to achieve a homogeneous heat-treated microstructure over the entire cross-section in the case of bars having a diameter of up to 40 mm. Therefore, the good machinability of the heat-treated steels according to the invention in a forming process is ensured.

Suitable forming processes for heat-treated steels according to the invention are in particular cold rolling processes.

Due to its high bonding energy, the dissolved boron tends to segregate at the grain boundaries. This boron which has segregated at the grain boundaries prevents the self-diffusion of the iron and diffusion of the carbon which is required for the formation of ferrite nuclei there. This leads to a shift in the diffusion-controlled transformation toward longer transformation times, which in a positive sense consequently brings about an increase in heat treatability and hardenability.

As is known from practice, boron has a high affinity to nitrogen and oxygen. In order to achieve an improvement in through-hardenability by dissolved boron, it is accordingly necessary to prevent bonding and precipitation of the boron as boron nitride and also bonding by oxygen. The boron must therefore be present in dissolved form in the austenite lattice, in order to be effective within the context of the invention.

The hardness-increasing effect of boron has been known for a long time and is utilized in the case of case-hardened steels and heat-treated steels with low and average carbon contents (up to 0.4%). In these fields of application, the strength and toughness properties comparable with conventional, alloyed steels are achieved by the use of boron.

However, the experts believed that the addition of boron was virtually ineffective in relation to the yield strength in the case of steels having a carbon equivalent above about 0.45%: the booklet 1/93 entitled "Thyssen Technische Berichte [Thyssen Technical Reports]" published the article entitled "Einsatz von Bor in hochfesten Feinkornbaustählen [The Use of Boron in High-Strength Fine-Grained Constructional Steels]," showing a diagram, on page 72 in FIG. 8, in which the connection between the yield strength and the boron content is shown.

The invention is particularly favorable from an economic point of view. Although, for improving heat treatability and through-hardenability, known steels can comprise expensive alloying elements such as chromium, nickel or molybdenum, instead of boron, in relatively high concentrations, which are added to the base material Cf53, and it is alternatively possible to use materials such as 50CrMo4. In both cases, however, considerably higher costs should be expected for acquiring the base material.

Nitrogen is present in principle for steel production. Nitrogen-free steels can only be produced in exceptional cases and with considerable expenditure. Steels according to the invention have the lowest possible nitrogen content, in order to minimize the required addition of titanium in a ratio of at least 3.5 parts to 1 part of nitrogen. For heat-treated steels according to the invention, an upper limit of 0.035% nitrogen has proved to be expedient. On the one hand, the required addition of titanium is kept within reasonable limits and on the other hand, the expenditure for the production of a steel which is as free of nitrogen as possible is kept within economically reasonable limits.

To avoid the bonding of boron by nitrogen, titanium is present in the heat-treated steel according to the invention as an inhibitor in a titanium to nitrogen ratio of 3.5:1 and more. In the series of nitride-thrming agents, the element Ti is rated to be even stronger than boron (i.e., has a greater affinity to nitrogen and forms a bond with nitrogen even before boron), and therefore Ti is well suited for the nitrogen bond. It is also conceivable to add an alternative nitride-forming agent, but the addition of titanium has proved to be suitable for economic reasons.

Correspondingly, aluminum, although slightly weaker with this action than titanium, supports the stabilization of a sufficiently effective, free, unbonded boron content. The addition of the alloying element aluminum serves for the deoxidation of the melt and for avoiding the bonding of the boron by oxygen.

Deoxidation means the withdrawal of oxygen from metal melts. The Al concentration required for deoxidation of the melt is 0.01-0.1%. Aluminum is an element which tends to form a bond with oxygen and is used in Al-killed steels for deoxidation (together with silicon). In addition, it also forms a bond with nitrogen in the form of extremely small precipitations which have a fine-grain-stabilizing effect. These precipitations contribute to inhibiting the undesired grain growth during the heat treatment.

Furthermore, the heat-treated steel according to the invention can be used for producing mechanical components which require a homogeneous heat treatability or hardenability even in the case of relatively large wall thicknesses or diameters and, for example, have to be hardened in their surface layers.

If the heat-treated steel according to the invention is in the form of bar material and, following machining by a forming process, is hardened in its surface layer and tempered, improved uniform hardness penetration together with a tough core is achieved compared to other known heat-treated steels.

The bar material produced from the heat-treated steel according to the invention can be heat-treated to a yield strength of at least 550 MPa.

To date, threaded spindles produced from bar material have been produced, for example, from the heat-treated steel Cf53 predominantly in the spheroidized state. Given a diameter of about 30 mm, the known C153 makes only a non-uniform through-hardenability possible, and the desired elongation limit $R_{p0.2}$ of at least 550 MPa has not been reached.

By admixing small quantities of the alloying element boron in the mass fractions indicated as a percentage and titanium, it is possible, for example, to achieve a general improvement in the heat treatability of the base material Cf53 (i.e., with the objective of achieving the most uniform heat-treated microstructure possible). This heat-treated steel according to the invention further developed in this way is referred to herein below as Cf53B.

The composition of the known Cf53 is suitable, in the context of rolling bearing technology, for producing a martensitically hardened surface layer capable of bearing full load, Measured against what is known as the surface layer hardness depth, the heat-treated steel Cf53B according to the invention achieves a hardness penetration (600 HV) of between 4 mm and 6 mm, measured from an end face of an end quench sample, under the technical boundary conditions—quenching performance. The microstructure in the core generally consists of a mixture of pearlite and ferrite with correspondingly low mechanical properties (for example yield strength).

Cf53 is a common steel for surface hardening or surface layer hardening. This steel is used for producing, by way of example, bolts, screws, gear wheels, shafts, spindles, camshafts, rolling bearings.

Compared to the conventional Cf53, the following general advantages arise, for example, with the Cf53B according to the invention: the ability to be heat-treated all the way through to a diameter of about 40 mm; a considerably more homogeneous microstructure than in the case of heat-treated C153, even in the case of relatively small diameters and a reduction in residual stresses and in distortion compared to the conventional, heat-treated Cf53.

By using the material Cf53B according to the invention in the heat-treated state, further advantages can be expected compared to the base material Cf53 in the spheroidized state: increase in the core strength, e.g. for threaded spindles of ball screw drives with a reduced diameter; targeted and precise setting and control of the mechanical properties; considerably better command of sensitive manufacturing processes, e.g. the rolling of the ball screw on threaded spindles of ball screw drives; general improvement in the hardenability of the surface layer, for example in the case of inductive hardening, From an economic point of view, the modified material Cf53B according to the invention as raw material represents an only slightly more expensive alternative to the base material Cf53.

Cf53 (1,1213 in accordance with DIN 17212) has a composition of 0.5-0.57% C, 0.15-0.35% Si, 0.5-0.7% Mn, 0.15-0.3% Cr, 0.02-0.08% Al. According to the invention, boron and titanium are added.

Heat-treated steels according to the invention preferably have a composition of 0.5-0.6% C, 0.-0.35% Si, 0.5-0.9% Mn, 0-0.3% Cr, with 0.003-0.005% boron as an additional alloying element; furthermore, titanium in a titanium/nitrogen ratio of $\geq 3.5:1$ and 0.01% to 0.1% aluminum.

The Cf53B according to the invention, which is particularly favorable from an economic point of view, is suitable for heat treatment all the way through and also for surface layer hardening, With the invention, it has been recognized that, in the case of the Cf53B according to the invention, the chromium content which is present in any case in the Cf53 improves the properties of the bar material formed from this steel in respect of the rolling resistance, The cause of the improved rolling resistance, in cooperation with the boron, is a finer microstructure.

The heat-treated steel according to the invention can be rolled to form bar material having a circular or polygonal cross-section, This bar material can be formed in a cold forming process preferably to give threaded spindles of ball screw drives or to give toothed racks of rack-and-pinion steering systems.

Bar steels according to the invention having a diameter of up to about 40 mm can be heat-treated all the way through and have a homogeneous heat-treated microstructure over the entire cross-section. The threaded spindles or toothed racks which have been produced by forming processes can be hardened in their surface layers and have a martensite microstructure in the surface layer.

A threaded spindle of a ball screw drive denotes a spindle which is provided on the outer circumference with a ball groove wound helically about the spindle axis for the rolling of balls.

The known continuous shape rolling process can favorably be used for cold forming of the bar steel to form a threaded spindle. The bar steel is inserted into a roll gap of the rolling tool. The rolling tool has rollers which are provided on the lateral surface with the bail groove profile to be rolled on the bar steel. With the rollers being pressed against the bar steel as the work piece to be machined and with rotation of the rollers, the ball groove is rolled into the lateral surface of the work piece, with the work piece advancing axially on account of the shaping of the rolling tool with the rotation of the rollers, such that the ball groove wound helically about the spindle axis is rolled in on the circumference of the work piece. Following the roiling process, the threaded spindle can be hardened in its surface layer.

The threaded spindles according to the invention are suitable in a particularly advantageous manner for use in an electromechanical steering system of a motor vehicle. In the case of these electromechanical steering systems, provision is often made of a rack-and-pinion steering system. A steering rod is connected at one end to a steering wheel and at the other end is provided with a steering pinion. The steering pinion meshes with a tooth system of the toothed rack. The toothed rack has the threaded spindle in its extension. The threaded spindle is part of a ball screw drive, in which a spindle nut operatively engages with the threaded spindle, with the interposition of balls, An electric motor is connected to the spindle nut by way of its rotor directly or with the interposition of a gearing mechanism. Activation of the electric motor causes the spindle nut to rotate. The rotation of the spindle nut is converted into an axial movement of the threaded spindle and therefore of the toothed rack. Steering actuations by the driver are aided by the connected electric motor. In a favorable manner, the toothed rack and the threaded spindle can be connected to one another in one piece to form a toothed rack element. With the heat-treated steel according to the invention, it is possible to provide a toothed rack element made of bar material by forming processes, in which case the tooth system of the toothed rack portion and also the helically wound ball groove are formed on a common, integrally formed component.

The heat-treated steel. provided according to the invention makes it possible to produce toothed racks or toothed rack elements of slender construction. In the case of the electromechanical steering systems described, the manufacturers of motor vehicles strive for toothed racks or toothed rack elements having a 0.2% elongation limit $R_{p0.2}$ of greater than 550 MPa. Although heat-treated steels which meet this demand are known, for example the heat-treated steels 42CrMo4 having a 0.2% elongation limit $R_{p0.2}$ of about 900 MPa, or 50CrMo4, these steels are very expensive. The heat-treated steel according to the invention is considerably less expensive in contrast and additionally meets the demand for a 0.2% elongation limit of much greater than 550 MPa.

The invention will he explained in more detail herein below with reference to three figures.

DETAILED DESCRIPTION OF THE INVENTION

Figure 1:
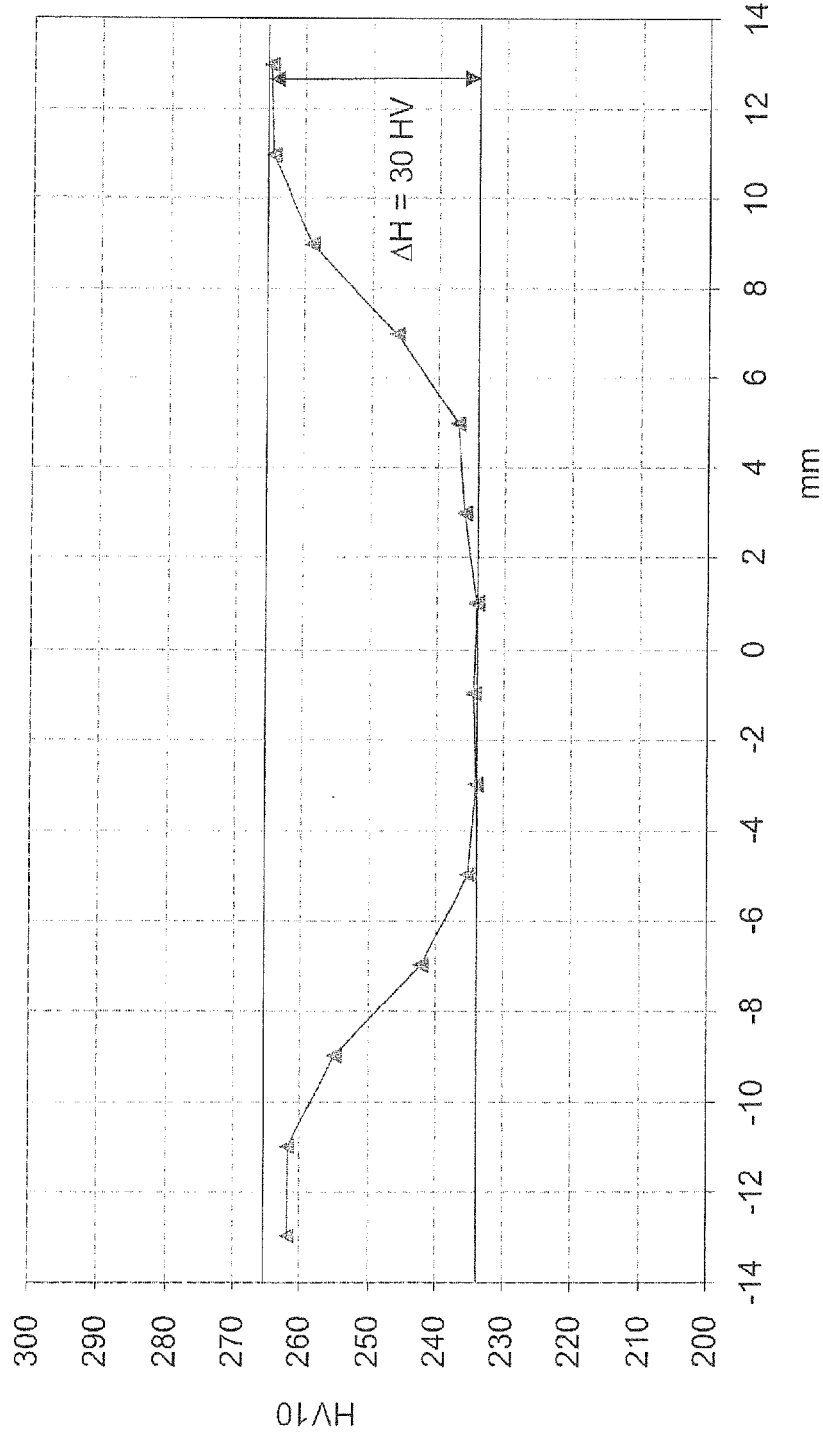
FIG. 1 shows the hardness profile through a round bar which is formed from heat-treated steel according to the invention and has a diameter of 28 mm.

FIG. 1 shows the hardness profile of a round bar which has been heat-treated all the way through and has a diameter of 28 mm, whereas the heat-treated steel according to the invention use was made of a modified Cf53 (1.1213 in accordance with DIN 17212), to which about 0.0033% boron was admixed in the melt. It can clearly be seen that there is only a weak drop in hardness from the surface to the center of the bar to an extent of about 30 HV10. The admixed boron ensures a homogeneous heat-treated microstructure over the entire cross-section, The Cf53 modified according to the invention is denoted as Cf53B (denoted by "E" in the figures).

Figure 2:
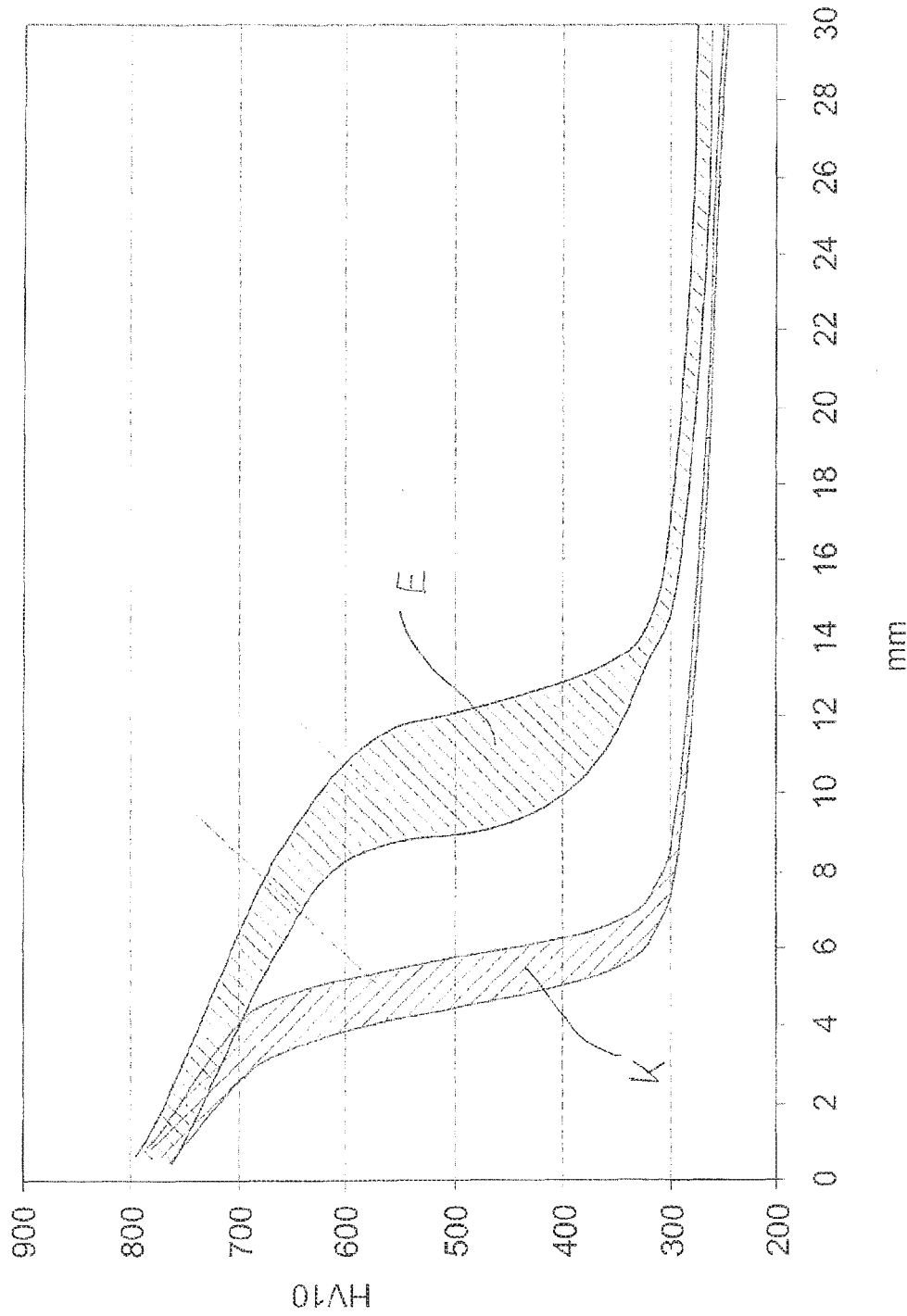
FIG. 2 shows the hardness penetration depth in the case of a conventional heat-treated steel and in the case of a heat-treated steel according to the invention, determined in an end quench test.

FIG. 2 shows a comparison between the Cf53 (denoted by "K") and the Cf53B according to the invention (denoted by "E") in a Jominy end quench test (DIN EN ISO 642). This process serves to test the hardenability of steel. This test determines the highest achievable hardness on quench hardening and the profile of the hardness into the depth given a certain cross-section (denoted as hardness penetration depth or else hardness penetration). In the Jominy end quench test, a cylindrical steel sample having a length of 100 millimeters and a diameter of 25 millimeters is heated to hardening temperature after the material-dependent normalizing, is then taken from the furnace within 5 seconds and is quenched at the end face from below for at least 10 min with a water jet at a temperature of 20° C. Then, the lateral surface of the cylinder is surface-ground oppositely by 0.4 to 0.5 millimeter. Proceeding from the surface of the quenched end face, the Rockwell hardness (HRC) or Vickers hardness (HV) is measured in steps (1.5-3-5-7-9-11-13-15-20-25-30-. . . millimeters).

It can be gathered from FIG. 2 that the hardness profile into the depth displays considerably higher values for the Cf53B compared to the Cf53. The values determined fall from a maximum at 1.5 millimeters as the distance from the quenched end face increases. Whereas the Cf53 displays values of less than 300 HV10 in a depth of 12 mm, values of approximately 550 HV10 are achieved with the Cf53B according to the invention, Furthermore, the drop in hardness into the depth is considerably more pronounced in the case of the Cf53 than in the case of the Cf53B. The Cf53B according to the invention accordingly has a more homogeneous microstructure than the known Cf53. These improved material properties can be attributed to the admixture of the boron.

By virtue of the addition of boron described according to the invention, it is possible for the hardness penetration capacity of the Cf53B to be increased in a very economical manner by the factor of 2 to 2.5 compared to the known Cf53.

Figure 3:
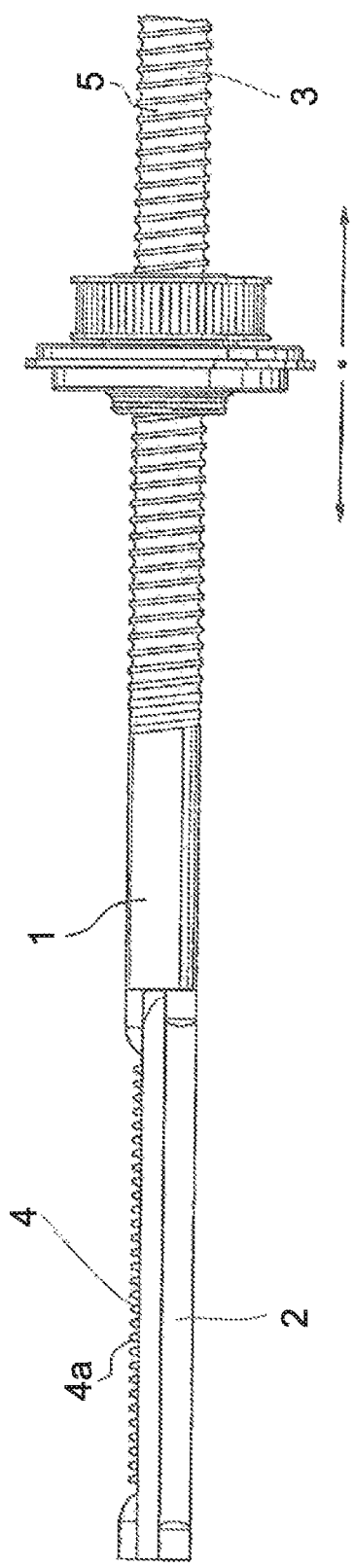
FIG. 3 shows a combined toothed rack of a rack-and-pinion steering system with a spindle nut, produced from a heat-treated steel according to the invention.

FIG. 3 shows a toothed rack element 1 according to the invention, in the case of which a toothed rack 2. and a threaded spindle 3 are connected to one another in one piece. The toothed rack 2 is provided with a tooth system 4, which is formed by a multiplicity of teeth 4a arranged in series along the axis thereof. The threaded spindle 3 is provided with a ball groove 5 wound helically about the axis thereof. The threaded spindle 3 is part of a ball screw drive (not shown here), which is known per se and in the case of which balls roll on ball grooves of a spindle nut and the threaded spindle 3.

The tooth system 4 and the ball groove 5 have each been produced in a rolling process on a round bar as the starting material. Following this machining by a forming process, surface layer hardening and tempering are carried out. The finished toothed rack element 1 has a 0.2% elongation limit of considerably more than 550 MPa.

Figure 4:
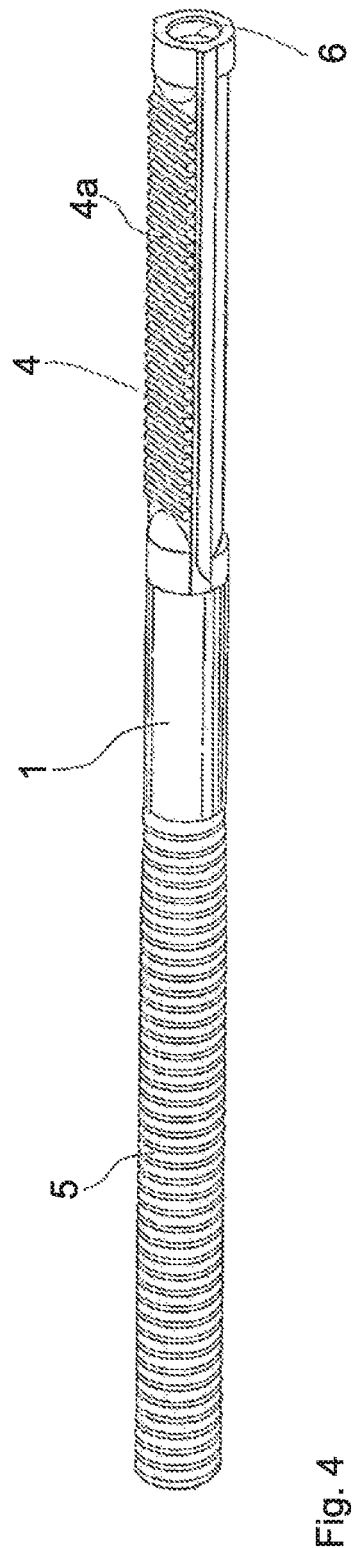
FIG. 4 shows the combined toothed rack from FIG. 3, but without a spindle nut.

FIG. 4 shows the toothed rack element 1 in a perspective illustration; it clearly shows the tooth system 4 and also a borehole 6 at the end for the connection of a steering system part, for example a track rod (not shown here).

LIST OF REFERENCE SYMBOLS

1 Toothed Rack Element
2 Toothed Rack
3 Threaded Spindle
4 Tooth System
4a Teeth
5 Ball Groove
6 Borehole

The invention claimed is:

1. A threaded spindle of a ball screw drive, having a ball groove wound helically about a spindle axis for rolling of balls, wherein:
the ball screw drive is formed from round bar material having a diameter of 10 to 40 mm;
the bar material has a core that is heat-treated to a yield strength of at least 550 MPa; and,
the bar material is formed from rolling resistant heat-treated steel comprising the following elements indicated in mass fractions in relation to overall weight: 0.5% to 0.6% inclusive carbon; 0.0031% to 0.005% inclusive boron; and at least 3.5 parts of titanium in relation to 1 part of nitrogen.

2. A toothed rack of a rack-and-pinion steering system of a motor vehicle:
formed from round bar material having a diameter of 10 to 40 mm; and,
comprising a tooth system formed by a plurality of teeth arranged in a row along the toothed rack wherein:
the bar material has a core that is heat-treated to a yield strength of at least 550 MPa; and,
the bar material is formed from rolling resistant heat-treated steel comprising the following elements indicated in mass fractions in relation to overall weight: 0.5% to 0.6% inclusive carbon; 0.0031% to 0.005% inclusive boron; and at least 3.5 parts of titanium in relation to 1 part of nitrogen.

3. A toothed rack element, comprising:

a toothed rack of a rack-and-pinion steering system of a motor vehicle, the toothed rack having a tooth system formed by a plurality of teeth arranged in a row along the toothed rack; and a threaded spindle of a ball screw drive having a ball groove wound helically about a spindle axis for rolling of balls, the toothed rack and the threaded spindle being connected to one another in one piece, and the toothed rack and the threaded spindle being formed from a bar material, which is round, having a diameter of 10 to 40 mm and a core that is heat-treated to a yield strength of at least 550 MPa, the bar material in turn being formed from a rolling resistant heat-treated steel comprising the following elements indicated in mass fractions in relation to overall weight: 0.5% to 0.6% inclusive carbon; 0.0031% to 0.005% inclusive boron; and 3.5 parts or more parts of titanium in relation to 1 part of nitrogen.

4. A toothed rack element, comprising:

a toothed rack of a rack-and-pinion steering system of a motor vehicle, the toothed rack having a tooth system formed by a plurality of teeth arranged in a row along the toothed rack; and a threaded spindle of a ball screw drive having a ball groove wound helically about a spindle axis for rolling of balls, wherein:

the toothed rack and the threaded spindle are connected to one another in one piece;

the toothed rack and the threaded spindle are formed from a bar material, which is round, has a diameter of 10 to 40 mm, and has a core that is heat-treated to a yield strength of at least 550 MPa; and, the bar material includes, in mass fractions in relation to overall weight:

greater than 0.55% and no more than 0.60% inclusive carbon;

0.0031% to 0.005% inclusive boron; and 3.5 parts or more parts of titanium in relation to 1 part of nitrogen.

\* \* \* \* \*